United States Patent [19]
Charlson

[11] Patent Number: 6,008,841
[45] Date of Patent: Dec. 28, 1999

[54] VEHICLE SURVEILLANCE CAMERA SYSTEM ACTUATED UPON PASSENGER ENTRY

[76] Inventor: Reginald T. Charlson, 4571 Sunnyhill St., Westlake Village, Calif. 91362

[21] Appl. No.: 08/349,728

[22] Filed: Dec. 5, 1994

[51] Int. Cl.$^6$ ....................................................... H04N 7/18
[52] U.S. Cl. .......................... 348/148; 348/153; 348/159
[58] Field of Search ....................................... 348/148, 143, 348/149, 151, 156, 159, 152, 153

[56] References Cited

U.S. PATENT DOCUMENTS

| | | | |
|---|---|---|---|
| 3,349,679 | 10/1967 | Lohman | 354/75 |
| 3,752,047 | 8/1973 | Gordon et al. | 354/145.1 |
| 4,001,881 | 1/1977 | Folsom | 348/159 |
| 4,630,110 | 12/1986 | Cotton et al. | 348/153 |
| 4,745,479 | 5/1988 | Waehner | 348/588 |
| 4,816,828 | 3/1989 | Feher | 348/148 |
| 4,843,463 | 6/1989 | Michetti | 348/148 |
| 5,027,104 | 6/1991 | Reid | 348/159 |
| 5,258,837 | 11/1993 | Gormley | 348/441 |
| 5,282,182 | 1/1994 | Kreuzer et al. | 348/148 |
| 5,319,394 | 6/1994 | Dukek | 348/148 |
| 5,402,167 | 3/1995 | Einbinder | 348/152 |
| 5,430,431 | 7/1995 | Nelson | 340/434 |

OTHER PUBLICATIONS

CEC Multi–Video Recorder CVR–1000 manual, Mar. 1987.

*Primary Examiner*—Bryan Tung
*Attorney, Agent, or Firm*—Jack C. Munro

[57] ABSTRACT

A security system for a vehicle which includes an internal compartment which is designed to contain humans. A door is formed within the exterior wall of the vehicle with the door providing access into and out of the internal compartment. A plurality of cameras are mounted within the internal compartment and exteriorly of the vehicle with one camera observing directly the area of the door. The output signals of all cameras are supplied through a multiplexer which causes all the output signals of the cameras to be placed on a single frame of the video camera permitting simultaneous observance of all cameras when the recorded film is observed by a human. When the door is closed, the signals of all cameras are reproduced on the video recorder at a slow playback speed. When the door is open, only the door mounted camera is recorded by the video recorder with sound also being recorded.

6 Claims, 1 Drawing Sheet

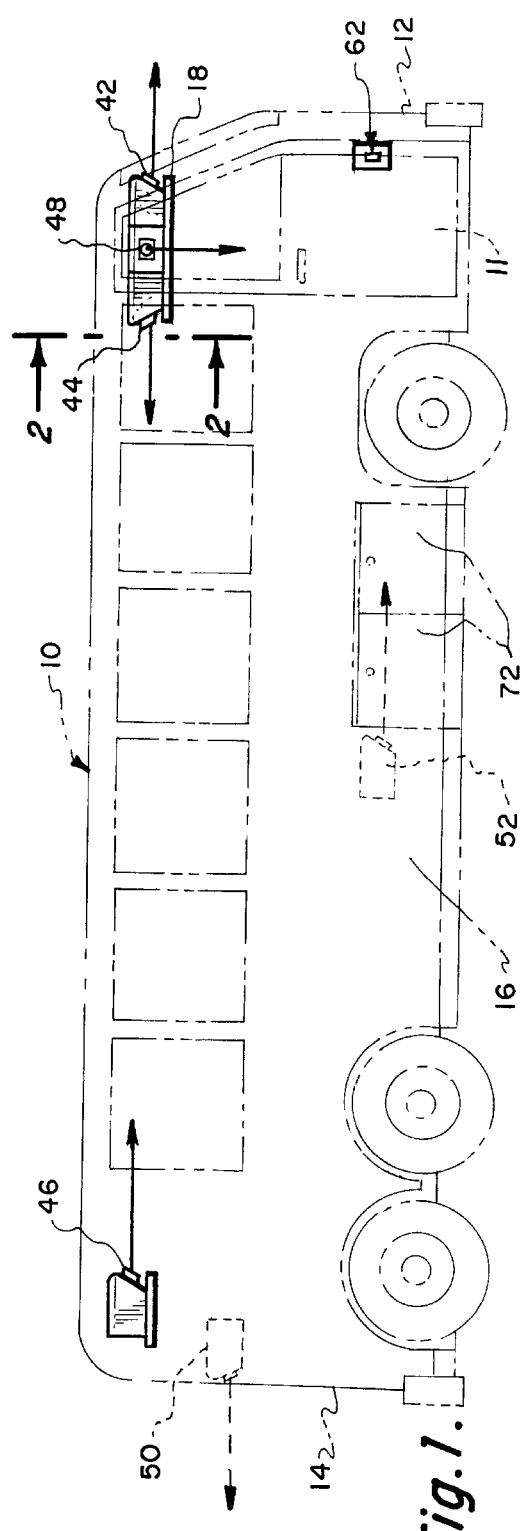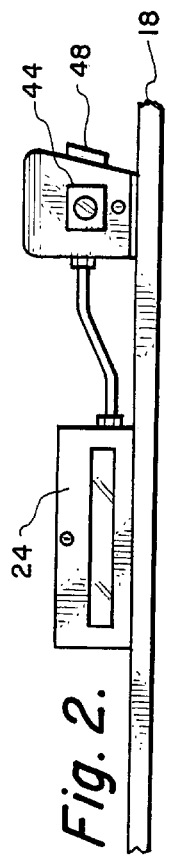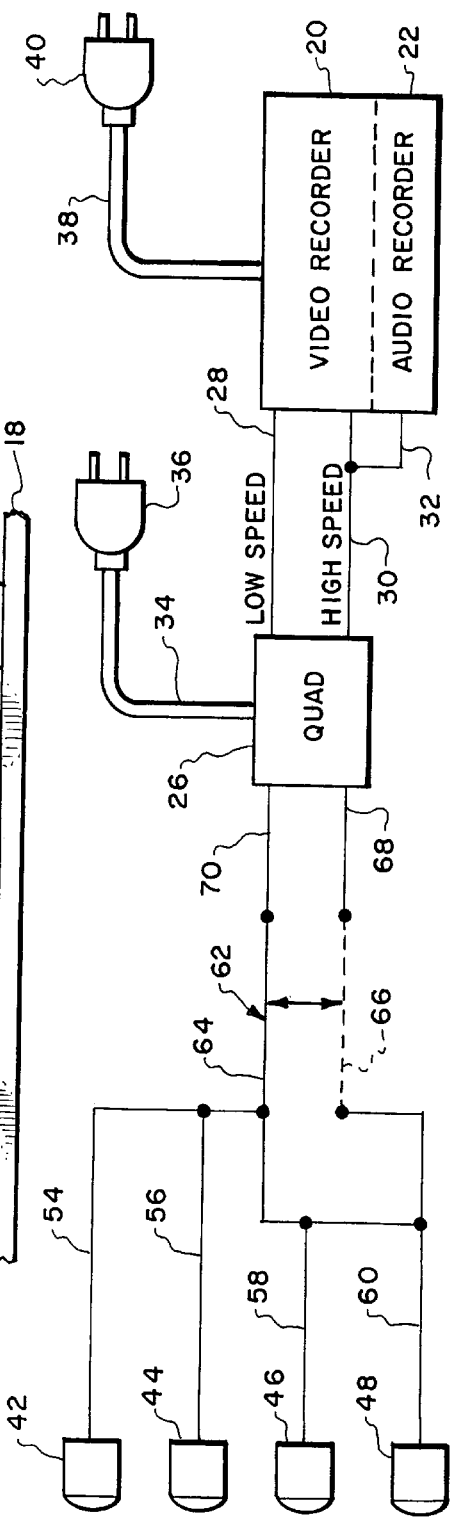

VEHICLE SURVEILLANCE CAMERA SYSTEM ACTUATED UPON PASSENGER ENTRY

BACKGROUND OF THE INVENTION

1) Field of the Invention

The field of this invention relates to security systems and more particularly to a security system for a vehicle such as a bus, train, plane or ship such as a ferry.

2) Description of the Prior Art

Security systems have long been known to be usable in conjunction with vehicles. Most security systems are designed to be an alarm of some sort and are used primarily in conjunction with automobiles and trucks. However, in connection with transportation type vehicles such as vans, recreational vehicles, buses, trains, including subways, planes and ships, there has long been a need to have a security system be operable during the time that the vehicle is being operated.

A desirable form of such a security system would be to observe the passenger compartment and vehicle surrounding area by cameras. There are times when passengers will allege that an accident has occurred which has caused them injury when in fact there has not been such an accident. If a camera recorded the alleged accident and discovered there was no such accident, this can eliminate fraudulent insurance claims.

Additionally, cameras can be used to make certain the driver of the vehicle is operating the vehicle correctly. For example, in the case of a bus, a camera can be mounted exteriorly of the vehicle to make sure that the operator of the vehicle is operating the vehicle safely in relation to other vehicles on the road. Also, when the passenger door of the bus is opened, it is normally required that the operator step to the bottom of the exit stairway of the bus to help any passenger(s) on and off to minimize accidents. If the operator is observed not following this procedure, appropriate disciplinary action can be taken. Also, cameras can be used by management to verify payment of correct fares on public transportation vehicles.

Prior to the present invention, there has not been known any security system for a public transportation vehicle such as a bus, train, plane or ship which would permit the management to observe at a later time what actually occurred while that public transportation vehicle was being operated.

SUMMARY OF THE INVENTION

The structure of the present invention is directed to a security system that is mounted in conjunction with a public transportation vehicle which can be then played back at a later time to inform the management of the public transportation vehicle of what has occurred during operation of that vehicle. In relation to a bus, there are to be a plurality of cameras mounted either inside or outside the bus to observe the activities of both inside and outside the bus during operation of the bus. There will be at least one camera recording the door area of the internal compartment of the bus. All cameras are connected to supply their output signals through a multiplexer which will cause all the signals to be simultaneously recorded on a single frame of the video tape. Normally these recordings occur at a very slow speed, such as one frame every four seconds. Since most of the accidents occur within a bus in the area of the door, when the door is opened, the camera that is observing the area of the door is now the only one that is being recorded on the video recorder. The speed of the video recorder is appropriately increased to resemble a conventional motion picture. Also sound is then recorded. When the door is closed, the security system immediately goes back to the slower speed with all cameras now being recorded simultaneously.

One of the objectives of the present invention is to include a security system within a public transportation vehicle where all activities of that public transportation vehicle can be recorded for use by management at a later time.

Another objective of the present invention is to construct a security system that is connected to operate by the ignition system of the public transportation vehicle so that the security system is operated only when the vehicle is operated.

Another objective of the present invention is to construct a security system composed of parts that can be assembled at a cost that is within the reach of most public transportation operators.

Another objective of the present invention is to incorporate a locking housing in conjunction with the security system so as to prevent unauthorized access into any portion of the equipment of the security system.

BRIEF DESCRIPTION OF THE DRAWING

FIG. 1 is a side elevational view showing a bus within which has been mounted the security system of the present invention;

FIG. 2 is a schematic view of the locking housing arrangement that is utilized in conjunction with a video recorder and a camera that is included within the security system of the present invention; and FIG. 3 is an electrical schematic view of the security system of the present invention.

DETAILED DESCRIPTION OF THE PREFERRED EMBODIMENT

Referring particularly to the drawing, there is shown a bus 10 as a typical type of vehicle within which the security system of this invention is to be employed. It is to be understood that instead of the bus 10, the security system could also be used in conjunction with trains, planes and ships such as a ferry. Basically, the security system of this invention could find usage in conjunction with any public or private transportation vehicle.

The vehicle 10 has a front wall 12, a rear wall 14 and sidewalls 16. Included within the bus 10 is an internal compartment with a shelf 18 being mounted therein. Mounted on the shelf 18 is a video recorder 20 which includes an audio recorder 22. It is considered within the scope of this invention that the video recorder 20, which includes the audio recorder 22, is deemed to be conventional and what is frequently in common usage at the present time. Electrical energy is supplied to the video recorder 20 and to the audio recorder 22 through an electrical conductor 38 which is connected to a plug 40. The plug 40 is to be appropriately connected to a source for electrical energy which would normally be the electrical powering circuit of the bus 10.

Also mounted on the shelf 18 is a multiplexer 26. Multiplexers are devices that receive multiple camera views and place such on a single viewing frame such as a videotape, monitor, etc. One such multiplexer is manufactured by Panasonic (Matsushita Electric Co., Ltd. of Japan). Another such device is called a quad and is manufactured by American Dynamics, Part No. AD 1472MIC. Both the multiplexer 26 and the recorders 20 and 22 are to be mounted within an enclosed lockable housing 24. Access into the lockable housing 24 will normally be by appropriate authorized personnel by means of a key. The multiplexer 24 is to be electrically driven also by a conductor 34 which connects to an electrical plug 36.

The multiplexer 26 is also deemed to be conventional and functions to receive a simultaneous series of video signals and takes those signals and has such recorded by the video recorder 20 simultaneously on a single frame of film. In other words, by way of example, if the multiplexer 26 is designed to receive simultaneously the signals from four cameras 42, 44, 46 and 48, the output signals of these cameras is reproduced and recorded on a single. frame of film within the video recorder 20. It is to be understood that the multiplexer 26 could be designed to receive the outputs of a greater number than four cameras and at times may receive as many as sixteen cameras or any number of cameras greater than one.

Also mounted on the shelf 18 is the door camera 48 as well as another camera 44 which is designed to observe down the center walkway of the bus 10. The observation of the camera 44 is in the rearward direction. Also mounted within the bus 10 is a camera 46 located at the back of the bus 10 designed to observe the center walkway of the bus toward the front of the bus. Also mounted on the shelf 18 is a third camera 42 which is designed to observe forwardly and exteriorly of the bus 10 and "see" what the operator of the bus observes. There also may be a camera 50 which may observe rearwardly of the bus 10 (for vehicle backing up purpose or other reasons) and a camera 52 positioned on the exterior wall of the bus 10 to observe the cargo doors 72. At times, these cargo doors 72 may be left open while the bus is being operated which may result in cargo from the cargo doors being accidentally dislodged. The signal from the cameras 50 and 52 could be supplied to a monitor through a multiplexer located in front of the operator of the bus 10 which would then tell the operator whether or not the cargo door 72 has been opened.

Included in the bus 10 is a passenger door 11. The passenger door 11 can be located in a closed position flush with the sidewall 16 or can be located in an open position substantially transverse to the sidewall 16. When the door 11 is in the closed position, there is a switch 62 mounted in conjunction with the door that causes all of the output signals from the cameras 42, 44, 46 and 48 to be respectively transmitted to their output lines 54, 56, 58 and 60, through conductor 64 of the switch 62 and through conductor 70 into the multiplexer 26. The output signals of all the cameras is then conducted through conductor 28 into video recorder 20, with this recording occurring at a slow speed. When the passenger door 11 is opened, only the signal from the camera 48 is then transmitted through line 66 and line 68 to multiplexer 26. From the multiplexer 26 the signal is transmitted through conductor 30 and into the video recorder 20 with the recording occurring at a higher speed. A typical low speed would take 120 hours to record completely a single videotape. A high speed would take six hours to record that same videotape. When the signal is being transmitted through conductor 30 into the video recorder 20, there is also activation occurring through conductor 32 to the audio recorder 22 of the video recorder 20. Therefore, it is to be understood that once the door 11 is opened, recording within the video recorder 20 occurs at a much more rapid rate in what is deemed to be normal motion picture representation. Prior to opening of the door 11, the recording occurs in a series of frames occurring a few seconds apart, such as four seconds a part.

Each of the cameras 42, 44, 46, 48, 50 and 52 are to be separately mounted in a vandal-proof/weather-proof locked housing.

What is claimed is:

1. In combination with a vehicle, said vehicle having an exterior wall which encloses an internal compartment, a passenger door formed within said exterior wall, said passenger door being movable from a closed position to an open position, said closed position being when said passenger door is flush with said exterior wall preventing access through said passenger door into said internal compartment, said open position being when said passenger door is located transverse to said exterior wall permitting access into said internal compartment, a security system comprising:

a plurality of cameras mounted in conjunction with said vehicle, one of said cameras comprising a door camera in position to observe the area of said door located within said internal compartment; and all of said cameras having an output signal which is transmitted to a multiplexer and into a video recorder, said multiplexer to cause the outputs of all said cameras to be placed on a single frame of said video recorder, said video recorder including an audio recorder, with said passenger door in said closed position said video recorder recording said output signal of each said camera at a first playback speed, with said passenger door in said open position said video recorder recording said output signal of only said door camera at a second playback speed, said first playback speed being substantially slower than said second playback speed, said first playback speed not including sound, said second playback speed including sound.

2. The security system as defined in claim 1 wherein:

said video recorder and said multiplexer being enclosed within a lockable housing.

3. The security system as defined in claim 1 wherein:

at least three of said cameras being located to observe said internal compartment.

4. The security system as defined in claim 1 wherein:

at least one of said cameras being positioned to observe forwardly and exteriorly of said vehicle.

5. The security system as defined in claim 1 wherein:

at least one of said cameras being positioned to observe rearwardly and exteriorly of said vehicle.

6. The security system as defined in claim 1 wherein:

said exterior wall including at least one cargo door, a camera mounted on said exterior wall in position to observe said cargo door.

* * * * *